United States Patent [19]

Steinhauser et al.

[11] Patent Number: 5,211,869
[45] Date of Patent: May 18, 1993

[54] PAN AGGLOMERATED DEICER COMPOSITIONS

[75] Inventors: Norbert J. Steinhauser, Dubuque; Kenneth C. Ossian, Bluegrass, both of Iowa

[73] Assignee: Ossian, Inc., Davenport, Iowa

[21] Appl. No.: 736,739

[22] Filed: Jul. 26, 1991

[51] Int. Cl.⁵ .............................................. C09K 3/18
[52] U.S. Cl. ........................................ 252/70; 106/13; 23/313 P; 264/117
[58] Field of Search .................... 252/70; 264/117; 23/313 P; 106/13

[56] References Cited

U.S. PATENT DOCUMENTS

| | | | |
|---|---|---|---|
| 2,988,509 | 6/1961 | Schilberg | 252/70 |
| 3,471,267 | 10/1969 | Capes et al. | 23/313 P |
| 3,760,050 | 9/1973 | Blacker et al. | 264/117 |
| 3,760,051 | 9/1973 | Eirich et al. | 264/117 |
| 3,772,202 | 11/1973 | Neitzel et al. | 252/70 |
| 3,906,140 | 9/1975 | Capes | 264/117 |
| 3,914,364 | 10/1975 | Engelleitner et al. | 264/117 |
| 4,277,253 | 7/1981 | Walter et al. | 264/117 |

Primary Examiner—Christine Skane
Attorney, Agent, or Firm—Zarley, McKee, Thomte, Voorhees & Sease

[57] ABSTRACT

A method of forming a deicer composition. The deicer composition comprises of a mixture of halide salts of alkali and alkaline earth metals which are then pan agglomerated to form a low bulk density easily dissolvable but free flowing agglomerate composition.

5 Claims, 1 Drawing Sheet

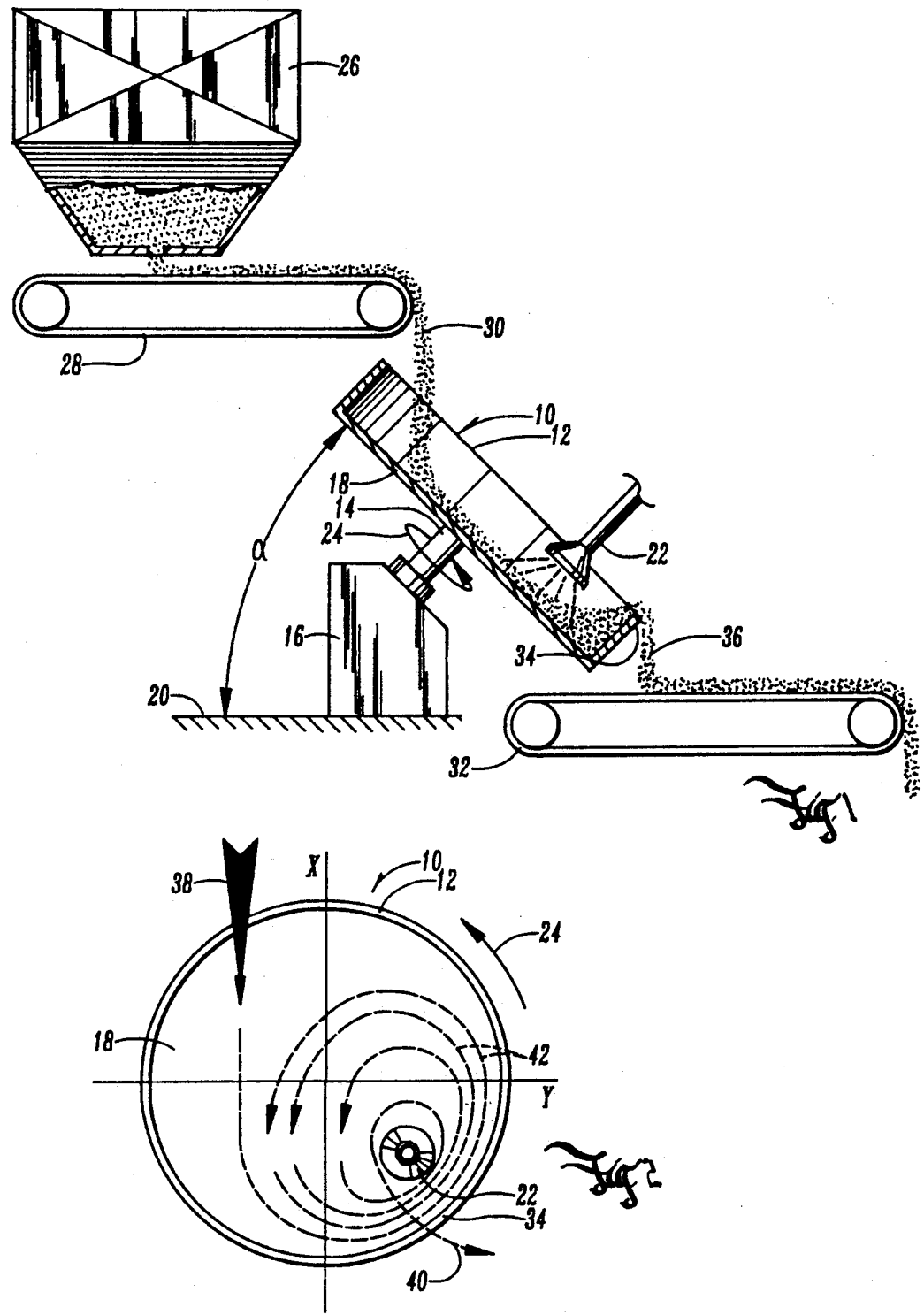

5,211,869

PAN AGGLOMERATED DEICER COMPOSITIONS

BACKGROUND OF THE INVENTION

The present invention relates to compositions for melting ice on surfaces such as streets, parking lots, sidewalks, etc. Such compositions are generally known, see for example, U.S. Pat. No. 2,988,509. Generally, and by way of example, these compositions commonly include monovalent and divalent chlorides, particularly of potassium, sodium, magnesium, and calcium. They are used in the maintenance of icy road surfaces and sidewalks during the winter. The combined use of sodium chloride and calcium chloride provides a composition which is effective at substantially lower temperatures and acts more rapidly to melt ice.

Use of a combination of sodium chloride and calcium chloride for deicing has existed since at least as early as the above referenced patent. However, one problem with these compositions is integrity of the composition during formation, storage, and use. For example, during use, the homogeniety of the composition, i.e. whether the sodium chloride settles away from the calcium chloride, as well as how fast the composition "melts" when exposed to snow and ice can both drastically affect the overall effectiveness of the composition. If, for example, individual particulate material of the composition becomes "fused" as it is exposed to snow and ice, the overall surface area is decreased and consequently, the effectiveness, in terms of rapidly melting the snow and ice is decreased. In short, if the particles are uniform, if they have a low bulk density, and if they are highly porous so that they are free flowing to maintain product integrity during storage, yet are also easily subject to fracture upon use, the most successful road and sidewalk deicing use will be achieved.

Much effort without success has been expended by those in the art in order to achieve a product which is, at the same time, stable during storage, free flowing, and yet which will also easily fracture to expose more surface and cause rapid melting of snow and ice during application.

It is a primary objective of the present invention to prepare uniform particles, substantially spherical in nature, which are highly porous, which have good product stability in packing, storage, and shipment, while also being easily subject to fracture, and therefore, disintegrate, and/or dissolve during use to allow rapid melting of snow and ice.

It is another primary objective of the present invention to provide the above composition by a method which involves pan agglomerating of deicer composition.

It is a further objective of the present invention to provide a composition which contains substantial amounts of sodium chloride and calcium chloride, which is made by pan agglomeration with a pan agglomerating fluid comprising mostly of a solution of magnesium chloride.

It is a further objective of the present invention to provide compositions of low bulk density, that are substantially spherical, highly porous particles, which provides for faster ice and snow melt than heretofore achievable.

It is a yet further process objective of the present invention to provide a process which is highly economical to perform, and which provides a sodium chloride, calcium chloride composition with minor amounts of magnesium chloride present and all in a pan agglomerated form.

It is a still further objective of the present invention to provide product which is pan agglomerated and, because of the use of this method of agglomeration allows for process flexibility to vary the composition of the deicer mixture as desired from run to run.

The method and manner of accomplishing each of the above objectives will become apparent from the detailed description of the invention which follows.

SUMMARY OF THE INVENTION

This invention relates to a unique appearance, pan agglomerated deicer composition wherein the preferred agglomerating fluid is a solution of magnesium chloride. The resulting particles are stable during storage, are highly porous, are spherical and easily and rapidly melt to cause melting of ice and snow. The particles have a bulk density from about 30 pounds per cubic foot to about 60 pounds per cubic foot. Compared to conventional deicer composition, pan agglomerates of the present invention have a generally lower bulk density, and increase in porosity, an increase in stability during storage, are more easily fractureable upon compression, and will result in faster deicing roads and sidewalks.

A BRIEF DESCRIPTION TO THE DRAWINGS

FIG. 1 shows a schematic representation of one method of carrying out the pan agglomerating process of the present invention.

FIG. 2 shows a plan view of pan agglomerator. The arrows representing rotational movement of the pan, and product flow characteristics through the pan agglomerator.

DETAILED DESCRIPTION OF THE INVENTION

As was earlier mentioned, the deicer composition of the present invention is formed from a mixture of halide salts of alkali and alkaline earth metals. Preferably the halide salts are chloride salts, and preferably the alkali and alkaline earth metals are sodium chloride, potassium chloride, magnesium chloride and calcium chloride.

In its broadest sense, the method comprises grinding the salts, mixing those to substantial homogeneity, spraying the mixed salts with an agglomerating fluid, and forming agglomerates on a pan agglomerator followed by drying.

The nature of the precise deicer composition for the present invention can vary, as the process operator chooses for a particular job application. However, satisfactory results are achieved with compositions similar to those described in U.S. Pat. No. 2,988,509 issued Jun. 13, 1961 to Schilberg, the disclosure of which is incorporated by reference.

In the Schilberg patent, a process forming and mixing a plastic mass is used which is then extruded to obtain a uniform product that is dried and then ground. The process of Schilberg is not cost efficient because of high capital equipment and energy requirements.

In accordance with the present invention the composition is provided in a pan agglomerated spherical form. It is much more stable, much more usable, and much more efficient in use than that shown by Schilberg. In particular, the salts are ground to a powder, mixed to a uniform composition and pan agglomerated in a manner as described below. Preferably it is an agglomerate with an agglomerating fluid such as water or other ice melting products dissolved in water. The agglomerates are dried to a desired moisture content to furnish a stable product under normal storage condition.

The invention is described below with the reference to the constituents most commonly available in practice and usable for deicer compositions, particularly sodium chloride, potassium chloride, calcium chloride, and magnesium chloride. It should, however, be recognized that for the purposes of the present invention, some of the sodium chloride portion can be replaced with potassium chloride. It is preferred that some portion of magnesium chloride be present in minor amounts, and as explained below, it is preferred that when used, the magnesium chloride be a solution and used as the agglomerating fluid. The advantages of the use of magnesium chloride in deicer compositions are disclosed in U.S. Pat. No. 3,772,202, Neitzel, issued Nov. 13, 1973, the disclosure of which is here incorporated by reference.

In the present invention, any halide salts may be used but the preferred are chlorides. The most preferred composition is sodium chloride, calcium chloride and minor amounts of magnesium chloride. In the general overall process, the mix of sodium chloride and calcium chloride are fed into a grinder, wherein the products are size reduced to a fine powder, generally having a particle size of 80 to 100 mesh. This powder is then fed into a disc or pan agglomerator at a uniform rate and a commercial grade of liquid magnesium chloride solution, generally having a 15% to 25% by weight water concentration is sprayed on the powder to form the agglomerates. The agglomerates are then dried, typically oven dried and may be screened to the desired size. The product will have substantially spherical shape, is a very low bulk density, is highly porus, is easily fractureable upon compression and is storable and stable. It does not disintegrate easily in the dry state and is not susceptible to packaging shifting. The uniformity, the high porosity, the easy nature of the product to fracture upon compression and the high amount of surface exposure, all substantially contribute to the ice melting effectiveness. The product has a bulk density within the range of 30 pounds per cubic foot to 60 pounds per cubic foot, preferably from 45 pounds per cubic foot to 55 pounds per cubic foot.

The process of the present invention comprises pan agglomerating of the deicer composition, preferably utilizing as an agglomerating fluid either water, a water solution of the entire composition, or a water solution of any single member of the composition, most preferably a water solution of magnesium chloride having a solution concentration of magnesium chloride within the range of about 15% to about 35% by weight.

Pan agglomerating as used herein refers to a process wherein the material to be agglomerated is placed in the upper portion of an inclined circular rotating pan and is allowed to tumble and simultaneously gravity feed towards the bottom of the pan, the material is in constant circular motion because of the revolving pan surface. Towards the bottom portion of the pan, agglomerating fluid is sprayed onto the tumbling and rotating material in order to form sites for agglomeration during subsequent rotations. Ultimately agglomerated product is discharged from the lower edge of the pan. A more complete description of pan agglomerating will be given in the context of the invention, and while describing the drawings. For further details in regard to pan agglomerating materials such as ore and other materials, see U.S. Pat. No. 1,239,221.

Turning now to a specific description of the pan agglomerating process of this invention, it will be given in connection with FIG. 1.

The pan agglomerator 10 comprises a shallow rotating circular pan 12 mounted on a shaft 14 which is connected to rotary means (not shown) and mounted on stationary platform 16. The bottom 18 of rotary pan 12 forms an angle, $\alpha$, with respect to the horizontal plane 20. Spray nozzle 22 is mounted above rotary pan 12 to allow spraying of agglomerating fluid onto particles contained in rotary pan 12. Directional arrow 24 shows the direction of rotation of rotary pan 12. During operation rotary pan 12 revolves in a fashion similar to that of an ordinary cement mixer.

In actual operation of the process of this invention, deicer composition is metered from hopper 26 onto endless conveyor belt 28 from which it is metered at a predetermined rate into an upper portion of rotary pan 12 as indicated by flow path 30. If desired, endless conveyor belt 28 need not be employed, and deicer composition from hopper 26 can be metered directly into the upper portion of rotary pan 12.

During operation, rotary pan 12 is continuously rotated by rotary means at a predetermined rate as measured in revolutions per minute. Because rotary pan 12 is mounted on an inclined angle, $\alpha$, the deicer composition which has been metered into the upper portion of rotary pan 12 has a tendency to gravity feed to the edge 34 of rotary pan 12 which is nearest the horizontal. In addition, the rotation of rotary pan 12 exerts a centrifugal force upon the deicer composition which has a tendency to thrust the deicer composition towards the outer peripheries of rotary pan 12. Thus, a definite force relationship exists which comprises a simultaneous exertion of the natural force of gravity as well as a centrifugal force created by the rotation of rotary pan 12. This force relationship will be explained in more detail hereinafter in connection with FIG. 2.

Simultaneously with subjection to the heretofore mentioned force relationship, agglomerating fluid is sprayed from spray nozzle 22 at a predetermined rate onto the deicer composition. The location of spray nozzle 22, as will be explained hereinafter in more detail in connection with FIG. 2, is generally in a lower quadrant of circular rotary pan 12 opposite the quadrant in which the deicer composition is metered into rotary pan 12.

The droplets of agglomerating fluid spray originating from spray nozzle 22 hit the deicer composition particles contained in rotary pan 12 and form a site of agglomeration, i.e., a point where other dry solids may adhere. During the tumbling action which is effected in rotary pan 12 and because of the force relationship set up in rotary pan 12, agglomerates gradually build up around the previously mentioned sites and, after these agglomerates reach a designated size, they spill over the lower edge 34 of rotary pan 12 in a manner shown by flow path 36 and can be collected for subsequent packaging and use. One convenient means of collection is a second endless conveyor belt 32.

Turning now to FIG. 2 which is a plan view of rotary pan 12 of FIG. 1, and which more clearly shows the force relationship created within rotary pan 12 of FIG. 1. For purposes of clarity and description, rotary pan 12 of FIG. 1 is shown in FIG. 2 as divided into four quadrants by lines X and Y. Point 38 located in the upper left quadrant of rotary pan 12 designates the point at which deicer composition is fed into the rotary pan 12. Directional arrow 40 indicates the direction of rotation of the rotary pan 12. Point 38 located in the lower right quadrant of rotary pan 12 indicates the position of spray nozzle 22 of FIG. 1. Assuming that the rotary pan 12 as shown in FIG. 1 is mounted on the inclined angle $\alpha$ of FIG. 1, point 38 of FIG. 2, i.e., where deicer composition is metered into rotary pan 12, is in the upper portion of rotary pan 12, and spray nozzle 22 of FIG. 1, as indicated by point 38 of FIG. 2, in the lower portion of rotary pan 12 nearest the edge from which discharge as shown by direction arrow 40 occurs.

Turning now to a description of the force relationship set up in rotary pan 12, the deicer composition which is metered in at point 38 because of the natural action of gravity tends to slide toward the lower quadrants of rotary pan 12 in a manner shown by dotted line 42. Because rotary pan 12 is rotating at a predetermined speed, the deicer composition particles are subjected to centrifugal force and move to the outer edge of rotary pan 12 and are carried in a manner shown by dotted line 42 along the peripheral wall as the pan starts rotation into the upper quadrants of rotary pan 12. As the deicer composition particles move in an upwards manner, gradually the effect of gravity causes them to fall in a manner indicated by dotted line 42 towards the lower quadrants of rotary pan 12. This action continues in the manner shown by dotted line 42 such that the overall effect is to create a vortex in the lower quadrant of rotary pan 12 nearest the point 38 at which spraying of agglomerating fluid occurs.

After spraying of agglomerating fluid has occurred, there is a formation of a "site" at which other deicer composition particles may aggregate and form larger agglomerated particles. These heavier particles being more affected by gravity travel to lower elevations within the upper quadrants, in a manner shown by dotted line 42, and gradually are naturally classified by the force relationship such that the larger agglomerated particles work themselves to the top of the quantity of deicer composition contained in rotary pan 12 and after reaching a specific size are discharged as indicated by directional arrow 40.

In the process, magnesium chloride solution is preferred as the agglomerating fluid. It is added to cause the calcium chloride portion of the mix to form calcium chloride tetrahydrate and calcium chloride hexahydrate having melting points of about 113.5° F. and 85.8° F. respectively. The hydration of calcium chloride in the sodium chloride mixture produces a sufficient heat to cause partial melting to calcium chloride thereby avoiding any need for use of an extrusion process, for example, as mentioned in U.S. Pat. No. 2,988,509. The present process allows the formation of the plastic mass within the agglomerate and after the agglomerate is formed. This, therefore, avoids the use of mechanical means such as milling, extrusion, and the use of external heat as described in U.S. Pat. No. 2,988,509. Thus it is far more economical.

Drying of the pan agglomerates is accomplished in the conventional manner by passing hot air through the agglomerated mass to drive off moisture. Preferably the moisture is removed to an overall moisture content from about 6% to about 12% by weight. This level, i.e. from about 6% to 12% moisture, is the amount required to give the desired hydrated forms of calcium chloride monohydrate, calcium chloride dihydrate and magnesium chloride hexahydrate. The result is that the preferred hydrates are present in the agglomerated low bulk density product. Calcium chloride monohydrate melts at 369° F., calcium chloride dihydrate melts at 349° F., and magnesium hexahydrate melts at 244° F. These melting points are such that the product can be commercially stored without melting and caking because of heat.

The following examples are offered to illustrate the pan agglomerating process of this invention, and to illustrate its use in sidewalk and road deicing. It should, of course, be kept in mind that the precise composition can vary and the moisture contents can vary in practice. Successful forming of pan agglomerates does, however, generally require a solution or magnesium chloride concentration of pan agglomerating fluid of from about 15% to about 35%.

As an example a mixture of 60% commercial grade sodium chloride containing 0.3% water and 40% commercial grade calcium chloride containing 20% water is mixed with sufficient water to give 18% of the total mixture. The formulation is:

40 parts commercial grade calcium chloride
60 parts commercial grade sodium chloride
9.82 parts water To arrive at 8% moisture of the final mix, 8.9 pounds of water per hundred weight or 179 pounds per ton of product is removed.

By using a commercial grade of magnesium chloride solution which contains 31% magnesium chloride for hydration, the result is:

40 parts calcium chloride
60 parts sodium chloride
14.2 parts magnesium chloride solution which is 4.4 parts magnesium chloride 9.8 parts water Since magnesium chloride hexahydrate is a stable compound at ambient temperatures, magnesium chloride in the formulation is an acceptable product for stability.

The above composition, once ground to a particle size of 80 to 100 mesh is pan agglomerated in accordance with the earlier description using the magnesium chloride solution as earlier described as the fluid. The rate of rotation in the pan agglomerator is 20-24 rpm, the incline of the pan (alpha) agglomerator is 45-47 degrees, and the rate of spray of the magnesium chloride solution on to the rotating particulate deicer composition is at a spray rate of 0.3 lbs. per minute. The agglomerates are as hereinafter described.

This agglomerated composition is used to deice sidewalks and roads and is quicker acting and more effective than non-agglomerated.

What is claimed is:

1. A method of forming a deicer composition, said method comprising:
    forming a mixture of halide salts of metals selected from the group consisting of alkali and alkaline earth metals;
    grinding said mixture of salts to a fine powder, and pan agglomerating said mixture using a magnesium chloride salt solution as an agglomerating fluid, and conventional removal of moisture with hot air to form dried, uniform, homogenous agglomerates.

2. The method of claim 1 wherein the magnesium chloride solution has a magnesium chloride concentration from about 15% magnesium chloride to about 35% magnesium chloride.

3. The method of claim 1 wherein said fine powder of salts consists of particles the size of 80 to 100 mesh.

4. A method of pan agglomerating a deicer composition mixture using a magnesium chloride salt solution as the agglomerating fluid, said method comprising:
   forming a mixture of halide salts of metals selected from a group consisting of alkali and alkaline earth metals;
   grinding the deicer composition mixture to a fine powder of particle size 80 to 100 mesh;
   placing size reduced particulate deicer composition mixture in a pan agglomerator;
   spraying an agglomerating fluid magnesium chloride salt solution having a salt concentration from 15 to 35 on said particulate deicer compositions;
   drying the resulting composition with hot air to form dried, uniform, homogenous agglomerates, substantially spherical in shape which are highly porous and which have a bulk density from about 30 pounds per foot cube to about 60 pounds per foot cube.

5. The method of claim 4 wherein the angle of pan incline of the pan agglomerator is from about 40° to about 60°.

* * * * *